United States Patent [19]

Lund et al.

[11] 4,213,070

[45] Jul. 15, 1980

[54] CONNECTING DEVICE FOR THE STATOR WINDING OF AN ELECTRIC MACHINE

[75] Inventors: Egon Lund; Per G. Sorensen, both of Sonderborg; Poul Petersen; Sverre M. Borgen, both of Nordborg; Jorgen C. Stannow, Sonderborg, all of Denmark

[73] Assignee: Danfoss A/S, Nordborg, Denmark

[21] Appl. No.: 932,433

[22] Filed: Aug. 10, 1978

[30] Foreign Application Priority Data

Aug. 16, 1977 [DE] Fed. Rep. of Germany ....... 2736831

[51] Int. Cl.² ............................................. H02K 11/00
[52] U.S. Cl. ...................................... 310/71; 310/260; 174/72 A
[58] Field of Search ................. 310/214, 194, 71, 260, 310/179, 180, 42, 184, 89; 339/119 R; 174/72 A

[56] References Cited

U.S. PATENT DOCUMENTS

| 2,997,531 | 8/1961 | Oldham | 174/72 A |
| 3,457,442 | 7/1969 | Charlton | 174/72 A |
| 3,836,415 | 9/1974 | Hinderbrandt | 174/72 A |
| 4,053,800 | 10/1977 | Hanning | 310/42 |
| 4,132,460 | 1/1979 | Porta | 310/71 |
| 4,151,434 | 4/1979 | Zona | 310/260 |

FOREIGN PATENT DOCUMENTS 1128540 4/1962 Fed. Rep. of Germany ........... 310/260

*Primary Examiner*—R. Skudy
*Attorney, Agent, or Firm*—Wayne B. Easton

[57] ABSTRACT

The invention relates to a connecting device for the stator winding of an electric machine such as an electric motor. The winding head is contained within a cover unit. The connecting device is installed within the cover unit and is used for joining the winding ends of the winding head with external heads. The connecting device has a head portion with grooves for receiving the winding ends and leads and a plug-in foot portion which is insertable into the grooves of the stator lamination packet.

4 Claims, 4 Drawing Figures

CONNECTING DEVICE FOR THE STATOR WINDING OF AN ELECTRIC MACHINE

The invention relates to a connecting device for the stator winding of an electric machine, wherein a comb-like fitting receives in parallel grooves connecting members which interconnect the winding ends and connecting leads, is secured to parts of the winding head and is provided with a closure covering the grooves.

It is known to interconnect the winding ends and connecting leads by sleeve-like connecting members and to dispose the sleeves in grooves of a fitting consisting of insulating plastics material. The fitting is bent to U-shape parallel to the grooves and placed on a skein of the winding head. The grooves are closed by a plastics film or the like connected to the fitting by heating. The application of this connecting device is cumbersome. In addition, it projects beyond the winding head. A pull on the connecting leads presents the danger of separating the fitting from the winding head.

The invention is based on the problem of providing a connecting device of the aforementioned kind which can be connected to the winding head in a very simple and secure manner and perferably also by saving space.

This problem is solved according to the invention in that the fitting comprises a plug-in foot which engages between two winding parts of the winding head and is held down by a cover ring of a winding head holder. By reason of the fact that the plug-in foot engages between parts of the winding head and is held in this position by the cover ring, the fitting is securely locked and also withstands external tensional loads on the connecting leads. The insertion is a very simple operation. The cover ring is already available because of the winding head holder. By selecting the point of insertion and the depth of insertion one can ensure that the fitting no longer projects beyond the winding head, thereby resulting in a space-saving construction.

With particular advantage, it is ensured that the grooves comprise abutments to prevent radially outward movement of the connecting members and that the fitting is secured against radial movement by peripheral wall portions connected to the cover ring—or a wrapping or the like. In this construction the connecting leads can have extraordinarily high tensile forces applied to them without damage. The tensile forces are transmitted through the connecting members by way of the abutments onto the fitting and the latter is supported against the peripheral wall parts or by the wrapping.

In the case of a connecting device for the stator winding of an asynchronous machine in which the main and auxiliary windings form inner and outer winding head portions, it is advisable to plug the plug-in foot radially inwardly of an outer winding head portion between two inner winding head portions. At this position there is sufficient space to receive such a fitting with a plug-in foot.

The plug-in foot should in this case converge along curved lines from the outer edge as well as from the two ends of the fitting. The plug-in foot will then conform to the contour of the stated winding head parts.

Further, the outer and inner edges of the fitting should lie on concentric circles. In this way the entire fitting can extend over the width of the cover ring. Radial grooves can have a correspondingly long length.

It is also favourable for the cover ring to have an outer peripheral edge engaged by outer fingers and for the grooves in the fitting to be so deep that the inserted connecting leads emerge between the outer fingers below the peripheral edge. In this way one ensures that on the one hand the fitting is secured against radial tension loading whereas on the other hand the connecting leads can simply be passed through the gaps between the outer fingers.

A winding holder has proved particularly suitable in which the cover ring is provided with inner fingers insertable in the grooves and outer fingers carrying a wedge at the end of a resilient section, edge wedge being held in the space between two grooves between the end face of the stator lamination packet and the winding head by means of a clamping ring embracing all the wedges. When the wedges are swung radially inwardly, they are forced between the end face of the stator lamination packet and the winding head, whereby at least at the thicker parts of the head, for example where the main and auxiliary winding are both present, these parts are pressed against the cover ring to give a very secure seating for this holder.

This pressing effect can also be achieved for the fitting if the plug-in foot has a counterbearing against which a wedge abuts.

Additional locking can be achieved if the plug-in foot terminates in two flat plug elements engaging over a stator tooth, i.e. somewhat inserted in adjacent grooves. The lower end of the plug-in foot is thereby secure and fixed at a predetermined position.

In particular, the flat plug elements can be parts os side walls which start at the fitting and are interconnected intermediate their ends by a transverse wall forming the counterbearing. This leads to a saving in material but nevertheless gives an adequately rigid construction.

The fitting may consist of individual bars interconnected at the base of the groove by thin-walled plastics hinges, the bars leaving a narrow gap between each other which diverges to the width of the connecting members only in the direction towards the base of the groove. To insert the connecting members, the grooves can be bent open about the plastics hinges. Subsequently, the bars return to their rest position. Despite the hinged connection of the fitting bars, adequate stability is ensured by the presence of the plug-in foot.

The invention will now be described in more detail with reference to an example illustrated in the drawing, wherein.

Figure 1:
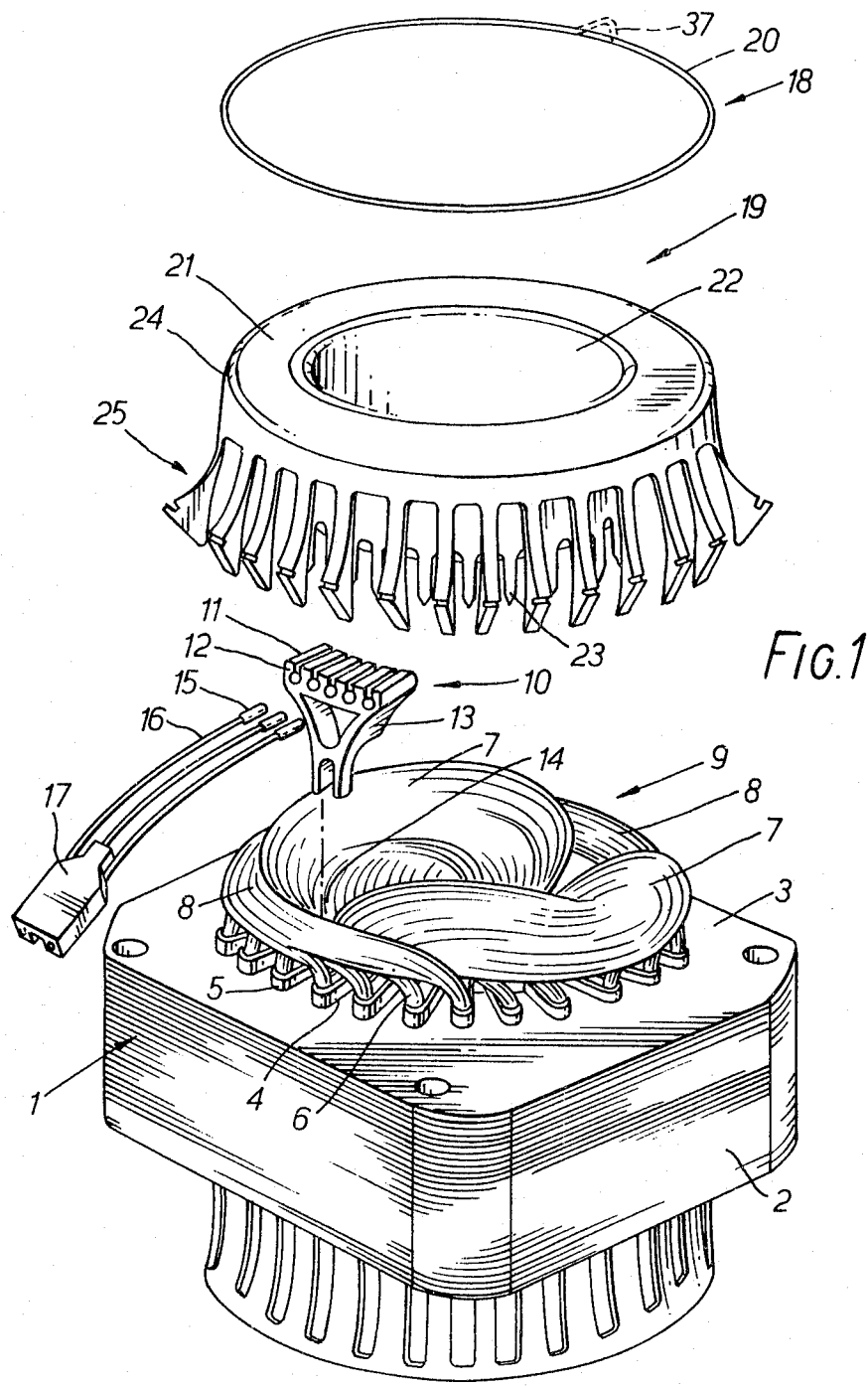
FIG. 1 shows the stator of a two-pole asynchronous motor having the holder already placed on one of its winding heads, the other winding head having the parts of the holder associated with it in exploded view.

A stator 1 of a double pole asynchronous motor comprises a lamination packet 2 with an end face 3 and grooves 4 provided with groove insulation 5. Skeins 6 of two windings pass through the grooves, namely of the main winding forming inner portions 7 and of the auxiliary winding forming outer portions 8 of the winding head 9, these portions being offset by 90°.

A plastics member 10 comprises a fitting 11 with a plurality of grooves 12 and a plug-in foot 13 which can be pushed into a space 14 between two inner winding head portions 7 and within an outer winding head portion 8. Connecting elements 15 are inserted in the grooves that connect the ends of the windings and connecting leads 16 leading to a plug connector 17. The top of the fitting 11 is at substantially the same level as the top of the winding head 9.

A holder 18 consists of a plastics member 19 and a clamping ring 20. The latter can be a wire welded at its ends. The plastics member comprises a cover ring 21 having an inwardly adjoining stiffening cylinder 22 which carries at its lower end inner fingers 23 whereas on the outside there is a downwardly extending peripheral edge 24 carrying outer fingers 25. The inner fingers 23 are parts of the groove closures and engage in the grooves of the stator 2. The outer fingers 25 are disposed in the peripheral direction between the inner fingers so that, when they are swung inwardly, they come to lie between two grooves.

Figure 2:
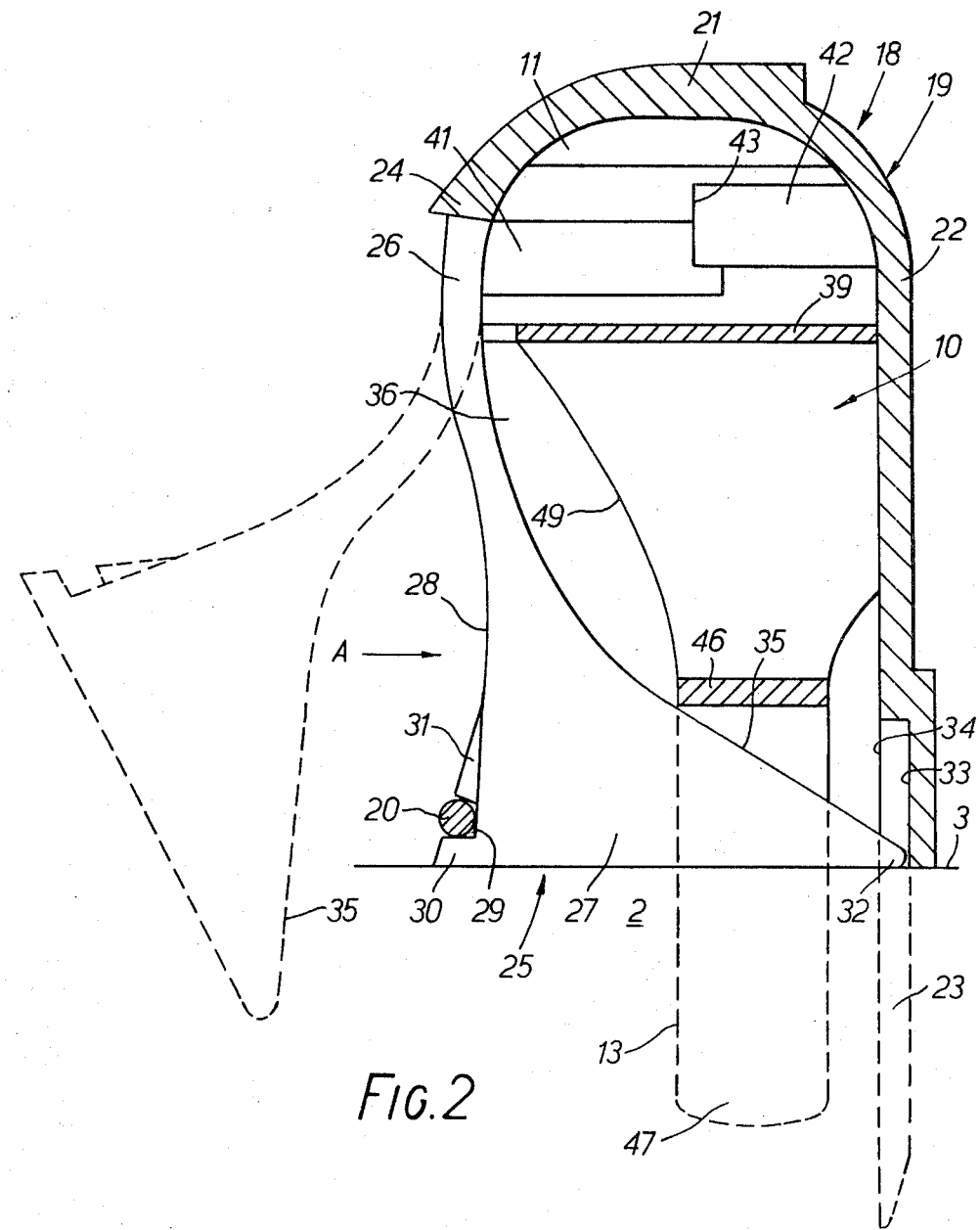
FIG. 2 is a section through one half of the holder with the connecting device inserted.
Figure 3:
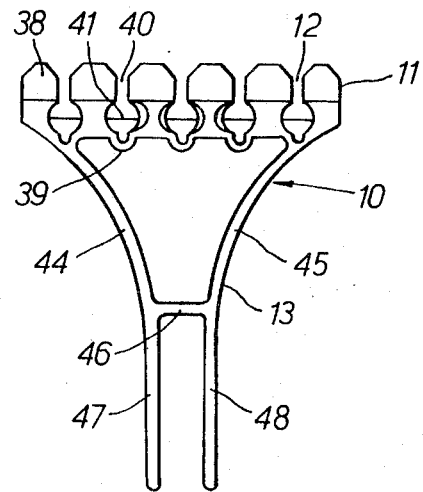
FIG. 3 is an end elevation of the fitting with plug-in foot to a scale which is reduced in relation to FIG. 2.

Each outer finger 25 consists of a resilient section 26 and a wedge 27. The outer face of the resilient section merges tangentially with the outer wedge surface 28. A groove 29 for receiving the clamping ring 20 is formed between a projection 30 extending beyond the outer wedge surface 28 and a ramp 31. The wedges 27 can be pivoted out of the rest position shown in broken lines in FIG. 2 up to the position shown in full lines in FIG. 2 where the wedge tip 32 lies against an abutment face 33 which is set back from the outer face 34 of the inner fingers 23 to form a depression which also secures the wedge in the peripheral direction.

During assembly, the plastics member 10 is pushed into the space 14 between the winding portions 7. The plastics member 19 is then somewhat introduced into the corresponding grooves with the inner fingers 23 until the tip 32 of the wedge is seated on the end face 3. The wedge faces 35 which extend approximately parallel to the inner fingers 23 and confront the winding head 9 here lie on a somewhat larger diameter than the outer diameter of the not yet completed winding head 9 so that the plastics member 19 can be easily pushed over the winding head. The clamping ring 20 is then pushed down to slide on the outer wedge face 28 and thereby swing the edges 27 radially inwardly about the resilient section 26 until the clamping ring 20 snaps into the groove 29. During this pivotal motion, the tip 32 of the wedge continuously rides on the stator end face 3 so that, with the aid of the upper wedge face 35, all the wires lying on the end face 3 are taken up and guided into the inner space 36. If necessary, the clamping ring can be shortened circumferentially by applying individual corrugations 37 and thereby stressed until the wedges 27 have been led inwardly as far as is possible. In this position the winding head 9 is well formed and securely held because, at least at the thicker portions of the winding head 9 where the parts of the main winding and the auxiliary winding are engaged, the winding head is clamped between the cover ring 21 and the upper wedge face 35.

The fitting 11 consists of a plurality, in this case 6, bars 38 which are interconnected near the base of the groove by plastics hinges 39. The grooves 12 remain between the bars and consist at the top of a narrow gap 40 and further down of two enlargements 41 and 42 which are staggered in height and therefore form an abutment face 43. The connecting leads and possibly the winding ends run in the enlargement 41. In the enlargement 42 there is the connecting member 15 which is secured against being flung out radially by the abutment face 43.

The plug-in foot 13 comprises two side walls 44 and 45 which are connected to the fitting 11 at the top, are bent to adapt to the inner winding head portions 7 and are connected at mid-height by a transverse wall 46 which forms a counterbearing for the wedge 27, the counterbearing holding the fitting 11 closely against the cover ring 21. The lower ends of the side walls form plug elements 47 and 48 which are pushed into adjacent grooves in such a way that they engage over that tooth on which the associated wedge 27 rests. The plug-in foot is also profiled by a curved line at its outer edge 49 to conform to an outer winding head portion.

Figure 4:
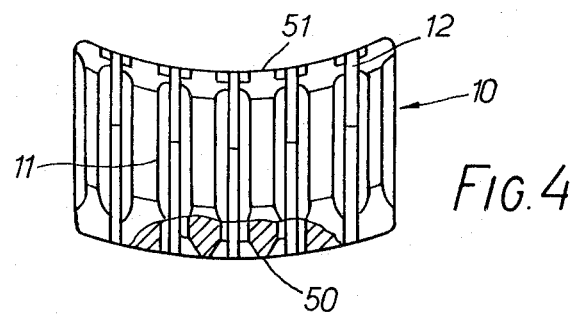
FIG. 4 is a plan view of the FIG. 3 construction.

As shown in FIG. 4, the outer edge 50 and inner edge 51 of the fitting 11 lie on concentric circles corresponding to the space beneath the cover ring 21. Consequently the plastics member 10 very accurately adapts to the inner shape of the plastics member 19, radially inward motion being prevented by the stiffening wall 22 and radially outward motion by the peripheral edge 24 and the outer fingers 25. The enlargement 41 is so deep that the connecting leads emerging therefrom can be passed out through the spaces between adjacent outer fingers 25.

The parts 10 and 19 can consist of the same plastics material, for example a polyester. Use is preferably made of a polybutylene terephthalate.

What is claimed is:

1. An electric machine having a stator lamination packet with a central opening and grooves arranged circumferentially relative to said opening, said packet having a flat end face, a winding head adjacent said end face having skeins extending into said grooves, a cover for said winding head, a connecting device having a head portion with parallel grooves for receiving winding ends of said winding head and external connecting leads, said connecting device having a foot portion which extends between winding parts of said winding head, said head portion being larger than said foot portion thereof with concave surfaces being between said head and foot portions to allow nesting of said connecting device in said winding head, said connecting device being held down by said cover.

2. An electric machine according to claim 1 wherein the back and front of said connecting device lie in concentric planes to provide nesting in and abutting contact with said cover.

3. An electric machine according to claim 1 wherein said cover has a stiffening ring portion with a plurality of circumferentially arranged outer fingers extending therefrom, said outer fingers being spaced to provide an entrance for an external connecting lead for said connecting device.

4. An electric machine according to claim 3 wherein a plurality of circumferentially arranged inner fingers extend from said stiffening ring and are insertable in said grooves of said stator lamination packet, said outer fingers each having a wedge shaped portion with a first edge engageable with said end face and a second relatively inclined edge engageable with the underside of said winding head, said wedge shaped portions being insertable in spaces between said grooves, said connecting device foot portion being bifurcated to form two plug elements which fit into two of said stator lamination packet grooves on opposite sides of one of said outer fingers, and means biasing said outer fingers radially inward relative to said central opening and one of said fingers into biasing engagement with said connecting device.

* * * * *